United States Patent [19]

Oguino

[11] Patent Number: 4,576,442
[45] Date of Patent: Mar. 18, 1986

[54] IMAGE PROJECTION APPARATUS

[75] Inventor: Masanori Oguino, Yokohama, Japan

[73] Assignee: Hitachi, Ltd., Tokyo, Japan

[21] Appl. No.: 576,958

[22] Filed: Feb. 3, 1984

[30] Foreign Application Priority Data

Feb. 4, 1983 [JP] Japan .................................. 58-16156

[51] Int. Cl.[4] ............................. G02B 1/06; G02B 3/12
[52] U.S. Cl. ........................................ 350/418; 350/412
[58] Field of Search ........................ 350/412, 418, 419

[56] References Cited

U.S. PATENT DOCUMENTS 2,165,078 7/1939 Toulon ............................. 350/418 X
3,632,873 1/1972 Henkin ............................. 350/418 X Primary Examiner—John K. Corbin
Assistant Examiner—Scott J. Sugarman
Attorney, Agent, or Firm—Antonelli, Terry & Wands

[57] ABSTRACT

In accordance with the present invention, there is provided an image projection apparatus comprising: a concave radiant plane for forming an original image, the radius of curvature of the concave radiant plane being one unit of length; a transparent medium layer having a refractive index of n, where n>1; a convex light exit plane having the radius of curvature of approximately n units of length, the convex light exit plane being placed forwardly in the normal direction of the radiant plane at a distance of approximately (1+n) units of length therefrom; the transparent medium layer having the refractive index of n filling substantially the space between the concave radiant plane and the convex light exit plane; and a vertex angle $\theta_3$ of the diverging light emitted from the light exit plane being $\theta_3 = \sin^{-1}(1/n^2)$.

2 Claims, 14 Drawing Figures

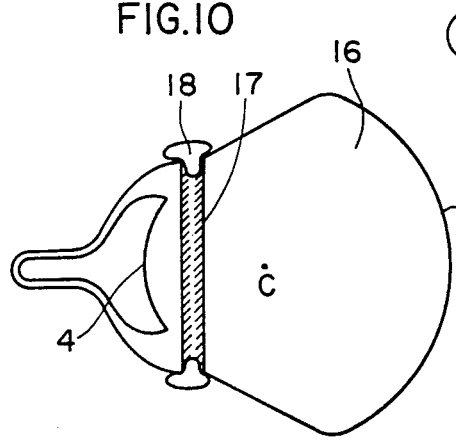
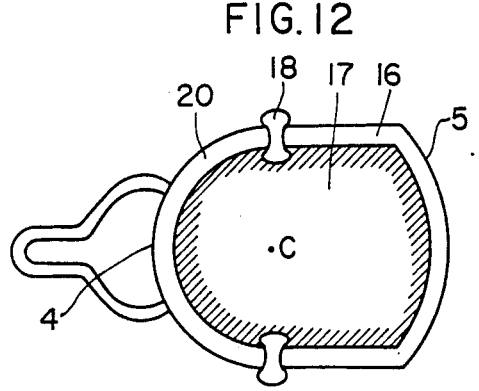
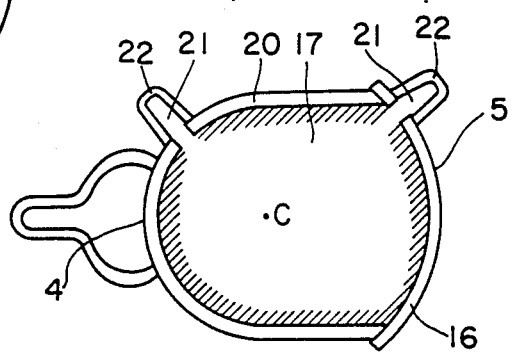
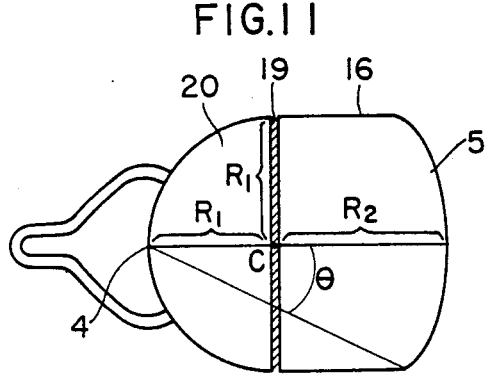
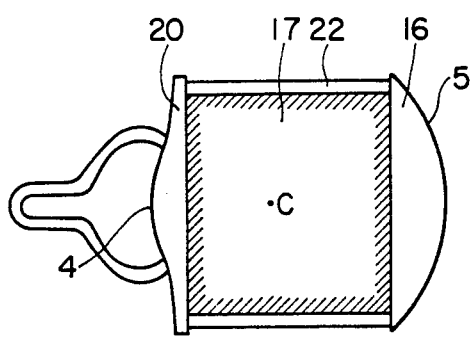

IMAGE PROJECTION APPARATUS

BACKGROUND OF THE INVENTION

The present invention relates to an image projection apparatus for enlarging and projecting an image received and displayed by a picture tube, and in particular to such an image projection apparatus which is excellent in the power efficiency and luminous flux utilization efficiency.

FIG. 1 illustrates the general configuration of an image projection apparatus. In FIG. 1, reference numeral 1 denotes a faceplate of a CRT (cathode ray tube). Numerals 2 and 3 denote a lens and a screen, respectively. In general, a compound lens composed of several lenses is used as the lens 2. In FIG 1, however, the compound lens is represented by a single lens.

In the configuration illustrated in FIG. 1, the surface illuminance $L_s$ (lux) of the screen 3 is related to the luminance Bt (cd/m²) of the CRT faceplate 1 by $$M^2 L_s = \eta \cdot \pi \cdot B_t \sin^2 \theta_M, \quad (1)$$

where:
$\eta$: light transmittance of the lens 2
$\theta_M$: half of angular aperture illustrated in FIG. 1
M: magnification
$\pi$: pi The expression (1) is obtained on the assumption that the faceplate 1 of the CRT forms a uniform diffusion surface and the so-called Lambert's cosine law holds true with respect to the light radiant intensity of the faceplate 1.

FIG. 2 illustrates the above described cosine law. Assuming that the light radiant intensity in the direction of the normal line of an area element taken on the plane 1 is $B_t$, it is said that the cosine law holds true with respect to the radiant intensity of the plane 1 provided that the radiant intensity in a direction forming an angle of $\theta$ with respect to the normal line is $B_t \cos \theta$. This is called the Lambert's cosine law.

FIG. 3 illustrates the relationship between the solid angle element $d\Omega$ and the plane angle element $d\theta$. The solid angle element $d\Omega$ is generally given by $$d\Omega = 2\pi \sin \theta \cdot d\theta.$$

From the foregoing description, it is understood that the quantity of light L captured by the lens 2 illustrated in FIG. 1, which is a part of the quantity of light emitted from a unit area (area element) of the faceplate 1, is given by $$\bar{L} = \int_0^{\theta_M} B_t \cos\theta \cdot 2\pi \sin\theta \cdot d\theta = B_t \cdot \pi \cdot \sin^2 \theta_M \quad (2)$$

Therefore, the right side of the expression (1) is equal to $\eta \bar{L}$. This value is equal to the quantity of light projected from a unit area on the faceplate 1 toward $M^2$ units of area on the screen 3 through the lens 2. That is to say, this value is equal to the left side of the expression (1), $M^2 L_s$.

From the above description, it is understood that $\sin^2 \theta_M$ indicates the converging power of the lens 2. The value of $\sin \theta_M$ is related to the F value (the ratio of the focal length to the aperture) of a lens by $$\sin^2 \theta_M = \frac{1}{4F^2 \left( \frac{M+1}{M} \right)^2 + 1}. \quad (3)$$

In recent years, various improvements have been vigorously introduced in a lens used for image projection. The limit values available in practical use at the present stage are as follows:
F=0.9
M≈1.0
$\sin^2 \theta_M = 0.20$ ($\theta_M = 27°$)
$\alpha = 25°$ (half of field angle illustrated in FIG. 1)
$\eta = 0.7$.

That is to say, the converging power is as low as approximately 20%.

Referring to FIG. 1, this means that the quantity of light as much as approximately 80% of the total amount of light emitted from the faceplate 1 has been discarded as the light which is outside of the half of the angular aperture $\theta_M$ (=27°). It has been keenly desired to hold the value of the half of a field angle $\alpha$ to be above 25° and to increase the converging power while maintaining the favorable focusing. Due to the limit in the lens design technology, however, it has heretofore been thought that it is extremely difficult to raise the converging power to be above 20%.

As described later, therefore, the inventor having studied causes of decrease in the converging power consider that the fundamental cause is that the light is emitted from the CRT faceplate over a wide angle range because of a uniform diffusion plane of the CRT faceplate. Accordingly, the inventor will propose to narrow the emission angle of the light emitted from the faceplate. Since such a proposal itself is already known, this known art will now be described.

FIG. 4 illustrates an conventional image projection apparatus which has been proposed in the U.S. Pat. No. 2,093,288, "Television Apparatus". In FIG. 4 numeral 1 denotes a CRT faceplate and numeral 5 denotes an exit plane of the light. The space between the CRT faceplate 1 and the transmission plane 5 is filled with a medium.

The conventional image projection apparatus illustrated in FIG. 4 aims at narrowing the divergence angle of the emitted light at the faceplate 1. As described later in detail, however, a CRT having a large emission angle (divergence angle) of the light emitted from the faceplate 1 is necessarily presupposed because of the structure of the conventional faceplate of CRT (picture tube). Accordingly, the conventional image projection apparatus illustrated in FIG. 4 also has the drawback that the luminous flux utilization efficiency is poor.

In addition, since the faceplate 1 must be formed of a flat plane, the spherical aberration for the focused image may be eliminated only on the optical axis. For the periphery of the image plane, however, large amount of astigmatism and coma are produced. That is to say, when beams a, b, and c are traced backward in FIG. 4, they do not converge to a point. And the occurrence of the spherical aberration at a point e is perceived. It will result in the deteriorated focusing of the projected image, bringing about a serious drawback.

SUMMARY OF THE INVENTION

The present invention aims at eliminating the drawback of the prior art as described above. Therefore, an object of the present invention is to provide an image projection apparatus having a radically improved utilization efficiency of luminous flux (eventually power efficiency) without a fear of spherical aberration for the focused image.

In accordance with the present invention, there is provided an image projection apparatus comprising: a concave radiant plane for forming an original image, the radius of curvature of said concave radiant plane being one unit of length; a transparent medium layer having a refractive index of n, where n>1; a convex light exit plane having the radius of curvature of approximately n units of length, said convex light exit plane being placed forwardly in the normal direction of said radiant plane at a distance of approximately (1+n) units of length therefrom; the transparent medium layer filling substantially the space between said concave radiant plane and said convex light exit plane; and the vertex angle $\theta_3$ of the diverging light emitted from said light exit plane to be $\theta_3 = \sin^{-1}(1/n^2)$.

BRIEF DESCRIPTION OF THE DRAWINGS

The above and other objects, features, and advantages of the present invention will be much clearer from the following description with reference to the accompanying drawings, in which:

FIGS. 9 to 14 illustrate embodiments according to the present invention.

DESCRIPTION OF THE PREFERRED EMBODIMENTS

At first, the study made by the inventor in order to attain the above described object will now be described.

The inventor thoroughly reviewed causes of a low converging power in the prior art from two aspects as follows:

(1) When the half of the angular aperture is increased above 27°, the spherical aberration is rapidly deteriorated. Accordingly, it is extremely difficult to radically improve the converging power by increasing the angular aperture.

(2) The fact that the light emitting from the CRT faceplate spreads out because of the uniform diffusion plane of the faceplate is the fundamental cause of the low converging power. Therefore, a fundamental improvement may be attained by narrowing the spread of the light in order to emit the light only toward the direction of the lens.

Whereas prior arts are mainly based upon the approach as described in (1) with the exception of the aforementioned U.S. Pat. No. 2,093,288, for example, the present invention aims at fundamentally improving the converging power in view of (2) described above.

Heretofore, only the efficient use of the light which has already been emitted from the CRT faceplate (glass) as the exit plane has been regarded as a main subject. Accordingly, the study on the spread of the light inside the CRT faceplate (glass) and on the spread of the light immediately after the light is emitted from the fluorescent substance has been extremely insufficient. Prior to devising the present invention, the inventor reviewed the physics of the light spread in these regions as described below.

Figure 5:
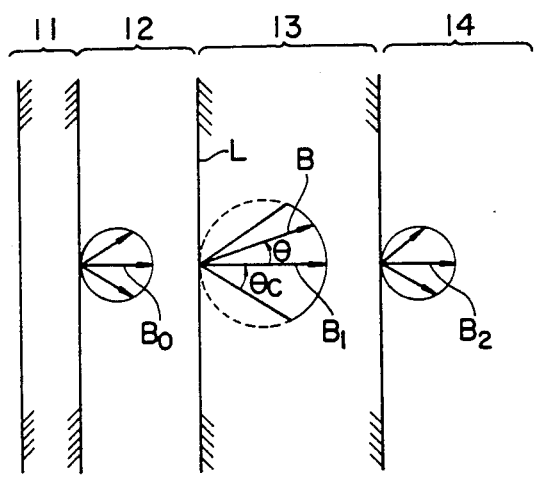
FIG. 5 shows the sectional structure of a CRT faceplate whereto the present invention is applied.

FIG. 5 shows the sectional structure of a CRT faceplate whereto the present invention is to be applied. In FIG. 5, numeral 11 denotes a fluorescent substance layer. From the left side, an electron beam is applied to the fluorescent substance layer 11 to stimulate it. The layer 11 emits the light toward the right side. On the left surface of the fluorescent substance layer 11, the so-called aluminum back is provided for passing the electron beam and reflecting the radiated light back toward the right side. The aluminum back is not illustrated in FIG. 5.

Numeral 12 denotes a medium layer (to be concrete, vacuum) having a refractive index close to unity. Although the layer 12 is extremely thin, it is depicted as a thick layer for clarity. Within the layer 12, the divergence of the light fed from the fluorescent substance layer 11 is presumed to satisfy the Lambert's cosine law as shown in FIG. 5. Assuming the quantity of light emitted from a unit area on the fluorescent substance layer has a component $B_o$ per unit solid angle in the normal line direction, the quantity of light per unit solid angle for a direction deviated from the normal line direction by an angle $\theta$ is represented by $B_o \cos \theta$.

Numeral 13 denotes a CRT faceplate glass layer having a refractive index n, where (n>1). At a boundary plane L between the layer 12 having the refractive index of unity and the glass layer 13 having the refractive index n, the divergence angle of the light is narrowed in accordance with the Snell's law. And the maximum divergence angle $\theta_c$ is equal to $\sin^{-1}(1/n)$. Assuming that at the boundary plane L the quantity of light per unit solid angle is B for the $\theta$ direction and is $B_1$ for the normal line direction, B is represented for a unit area of the fluorescent substance layer 11 as $$B = B_1 \cos\theta \quad \text{for } \theta \leq \theta_c \atop B = 0 \quad \text{for } \theta > \theta_c \quad (4)$$

Considering the consecution law of the total amount of light emitted from a unit area of the fluorescent substance layer 11 and the expression (2), the quantity of light $B_o$ in the normal line direction within the layer 12 of the medium having the refractive index of unity is related to the quantity of light $B_1$ in the normal line direction within the glass layer 13 having the refractive index n by $$\pi B_o \sin^2 90° = \pi B_1 \sin^2 \theta_c = \pi B_1 \left(\frac{1}{n}\right)^2. \quad (5)$$

$$\therefore B_1 = n^2 B_o$$

Pertaining to the present invention, the expression (5) suggests a very important fact. That is to say, the quantity of light per unit solid angle in the faceplate glass layer 13 is $n^2$ (generally 2.25 since n is typically 1.5) times that in the layer 12 of the medium having the refractive index of unity. And the divergence angle is compressed to $\sin^{-1}(1/n)$ (approximately 42° provided that n=1.5) in the faceplate glass layer 13. Accordingly, it is suggested that the effect of the light capturing power amounting to 100% (angular aperture is to be 180°) may be attained by effectively utilizing as the projected light a component of the light transmitted through the glass layer 13, which falls within a region between the divergence angles of ±42°.

In FIG. 5, numeral 14 denotes an air layer. Owing to the refraction of the light effected at the boundary plane between the glass layer 13 and the air layer 14, the divergence characteristic of the light emitted from the boundary plane becomes the same as the divergence characteristic of the light in the layer 12 of the medium having the refractive index of unity. That is to say, assuming that the quantity of light per unit solid angle in the air layer 14 is $B_2$ for the normal line direction, the relation $B_2 = B_1/n^2 = B_o$ ensues.

Owing to the existence of the layer 12 of the medium having the refractive index close to unity between the fluorescent substance layer 11 and the glass layer 13 as illustrated in FIG. 5, the divergence angle of the light is limited to the angle $\theta_c$ as described above in the faceplate glass layer 13. This fact is understood from the above described analytical study.

The layer 12 is actually a thin layer of vacuum. Such a layer is considered to be naturally formed when fluorescent substance particles each of which is not less than approximately 10 μm in diameter are attached to the internal flat surface of the faceplate glass by the conventional wet process in manufacturing the picture tube.

Figure 6:
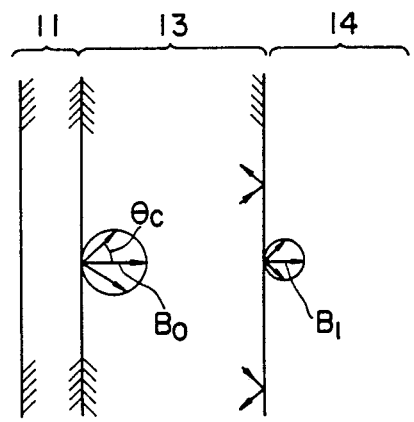
FIG. 6 shows the sectional structure of a CRT faceplate produced by a different production method.

FIG. 6 illustrates the sectional structure of the CRT faceplate when fluorescent substance particles are attached to the internal surface of the faceplate glass by using the evaporation method instead of the wet process in manufacturing the picture tube. In FIG. 6, the layer of the medium (vacuum) having a refractive index of unity is not formed between the fluorescent substance layer 11 and the glass layer 13. Numeral 14 denotes an air layer.

In such a faceplate structure, the light divergence characteristic within the glass layer 13 becomes the characteristic whereby the light fully diverges from the normal line direction to the angle of 90°, i.e., the characteristic whereby the Lambert's cosine law holds true. Therefore at the boundary surface between the glass layer 13 and the air layer 14, the component of the light having a divergence angle exceeding $\theta_c$ (approximately 42°) is not emitted to the air layer 14 since it is totally reflected. Only the light component having a divergence angle which does not exceed $\theta_c$ is emitted to the air layer 14. With respect to the total amount of light $\pi B_o$ emitted from the plane of the fluorescent substance layer 11, the effective quantity of light actually emitted to the air layer 14 is known to be $\pi B_o \sin^2\theta_c$ and only about 44% (the value of $\sin^2\theta_c$) of the total amount of light $\pi B_o$ from the relation represented by the expression (2).

That is to say, the CRT having the faceplate structure illustrated in FIG. 6 has a luminous flux utilization efficiency which is much lower than that of the CRT having the faceplate structure illustrated in FIG. 5.

In the U.S. Pat. No. 2,093,288 described before by referring to FIG. 4, the CRT having the faceplate structure as illustrated in FIG. 6 is presupposed, resulting in an extremely low luminous flux utilization efficiency.

Heretofore, the study made by the inventor on the spread of the light immediately after the emission from the plane of the fluorescent substance has been described.

Embodiments of the present invention will now be described by referring to drawings.

Figure 7:
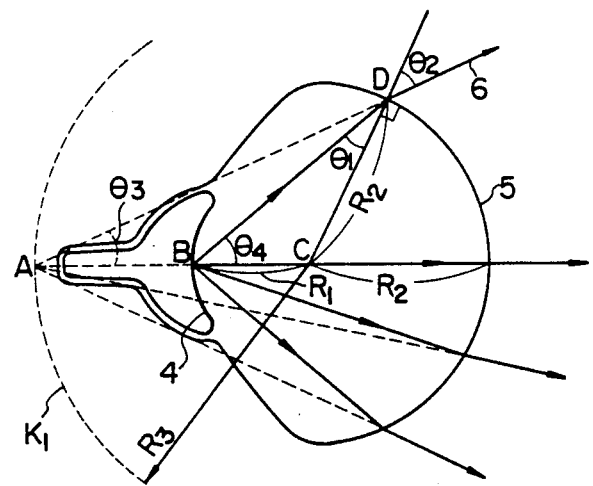
FIG. 7 shows the structure of a basic embodiment according to the present invention.

FIG. 7 shows the configuration of a basic embodiment according to the present invention.

Figure 4:
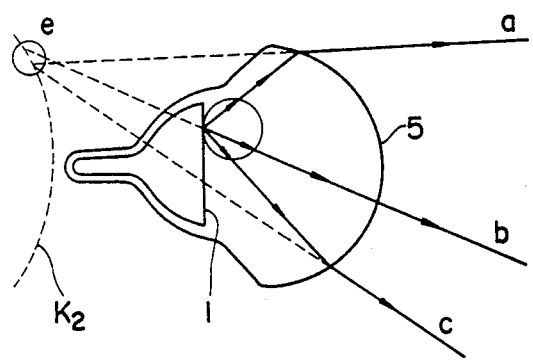
FIG. 4 illustrates an example of a conventional image projection apparatus.

In FIG. 4, numeral 4 denotes a CRT fluorescent substance plane which is formed as a concave surface having the center of curvature C and the radius of curvature $R_1$. Numeral 5 denotes a CRT exit plane which is formed as a convex surface having the center of curvature C and the radius of curvature $R_2$. The radii $R_1$ and $R_2$ are so defined as to nearly satisfy $$R_2/R_1 = n. \tag{6}$$

In the expression (6), n represents the refractive index of a CRT front section which is composed of glass placed between the fluorescent substance plane 4 and the exit plane 5. The value of n is typically 1.5. The spacing between the concave fluorescent substance plane 4 and the exit plane 5 is so defined as to be nearly equal to $(R_1 + R_2)$. By defining so, the light emitted from an arbitrary point B on the fluorescent substance plane 4 is refracted at the exit plane 5 in accordance with the Snell's law. As a result, the light is diverged into the air as if it was emitted from a point A which was at a distance $R_3 = nR_2$ from the center C.

The point A exists on the extension of the line CB and exists on the radius of curvature $R_3$ with the center C. This is due to the fact that in FIG. 7 $\triangle BCD$ and $\triangle DCA$ own jointly the angle at the point C, and besides each of $\triangle BCD$ and $\triangle DCA$ has two sides having the ratio n ($R_2/R_1 = n$ for $\triangle BCD$, $AC/R_2 = n$ for $\triangle DCA$). Accordingly, $\triangle BCD$ and $\triangle DCA$ are similar triangles. Thus, the following expression ensues.

$$\overline{AD} = n \cdot \overline{BD} \tag{7}$$

From the similarity, $\theta_3 = \theta_1$ and $\theta_4 = \theta_2$.

The right side of the expression (7) represents the distance obtained by converting the optical distance $\overline{BD}$ within the medium having the refractive index n into a distance within the air. Since the converted distance is equal to the left side of the expression (7), it will be appreciated that the light 6 emitted from the exit plane (lens surface) 5 looks as if it went straight ahead in the air from the point A. This characteristic is maintained whatever position of the fluorescent substance plane 4 the point B is located on. This is because the fluorescent substance plane 4 and the exit plane 5 form homocentric spherical surfaces with a common center C.

From the above described similarity principle, the angle $\theta_3$ illustrated in FIG. 7 is equal to $\theta_1$ and the angle $\theta_4$ is equal to $\theta_2$. Therefore application of the Snell's law to the exit plane 5 yields $$\sin \theta_4 = n \sin \theta_3. \tag{8}$$

When the faceplate structure described before by referring to FIG. 5 is adopted as the structure of the fluorescent substance plane 4, the maximum value $\theta_c$ of the angle $\theta_4$ is equal to $\sin^{-1}(1/n)$ as described before.

Accordingly, the maximum value $\theta_{3\ MAX}$ of the divergence angle $\theta_3$ is given by $$\sin \theta_{3\ MAX} = (1/n) \sin \theta_{4\ MAX} = 1/n^2. \quad (9)$$

Assuming that $n = 1.5$, it follows that $$\theta_{3\ MAX} \approx 26°.$$

Figure 8:
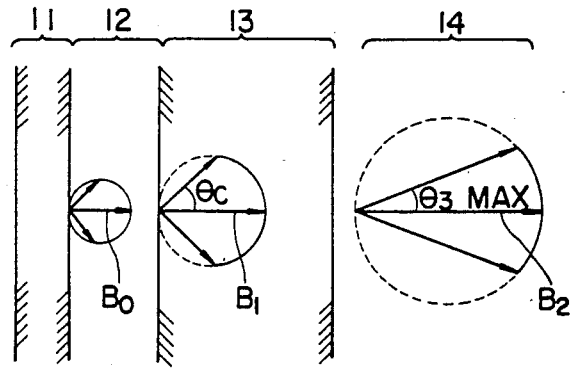
FIG. 8 is a diagram, similar to FIG. 5, concretely illustrating the principle of the present invention.

The above described result is illustrated in FIG. 8. In the same way as FIG. 5, numerals 11, 12 and 13 in FIG. 8 denote a fluorescent substance layer, a medium layer having a refractive index of unity, and a faceplate glass layer, respectively. Numeral 14 denotes an air layer. The air layer 14 is depicted for illustrating the state of the light which has passed the convex exit plane 5 illustrated in FIG. 7.

In FIG. 8, the quantity of light $B_o$ per unit solid angle in the medium layer 12 having the refractive index of unity is generated in the normal line direction by the light emitted from a unit area on the plane of the fluorescent substance layer 11. The quantity of light $B_1$ per unit solid angle in the glass layer 13 in the normal line direction is related to $B_o$ by $B_1 = n^2 B_o$. The divergence angle $\theta_c$ may be represented as $\theta_c = \sin^{-1}(1/n)$. In the air layer 14, the quantity of light $B_2$ per unit solid angle in the normal line direction is related to $B_o$ by $B_2 = n^4 B_o$. The maximum divergence angle $\theta_{3\ MAX}$ may be represented as $\theta_{3\ MAX} = \sin^{-1}(1/n^2)$. These relations may be easily understood from the foregoing description.

After all, the divergence angle $\theta_3$ of the light emitted from the image projection apparatus which is illustrated in FIG. 7 as an embodiment of the present invention is narrowed to $\sin^{-1}(1/n^2)$ (approximately 26°). The quantity of light $B_2$ is $n^4$ times (approximately 5 times) the quantity of light $B_o$ which has been generated at the fluorescent substance plane 4.

Figure 1:
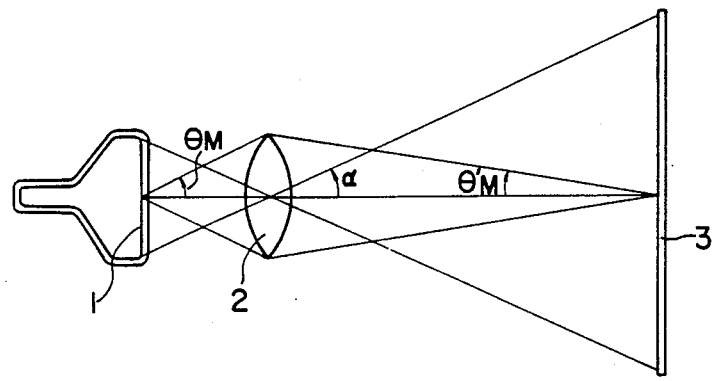
FIG. 1 is a diagram illustrating the basic configuration of an image projection apparatus.
Figure 2:
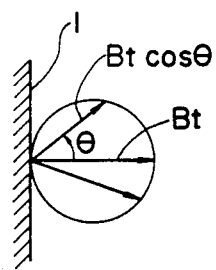
FIG. 2 is a diagram illustrating the Lambert's cosine law.
Figure 3:
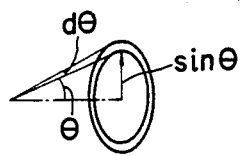
FIG. 3 is a diagram illustrating the relationship between the solid angle element and the plane angle element.

As already described on the prior art, the conventional projection lens technology has given the value of approximately 27° to the half of the angular aperture $\theta_M$ illustrated in FIG. 1. The half of the angular aperture 27° corresponds to the F value of 0.9. Therefore by combining the image projection apparatus illustrated in FIG. 7 as an embodiment of the present invention with a lens having an F value of 0.9, it becomes possible to realize an optical sysltem for image projection which has an efficiency close to 100%.

As described before, the virtual image for an original image generated on the fluorescent substance plane 4 is formed on the spherical surface which is at a distance of $R_3 (= nR_2)$ from the common center C. The polarity of curvature of the image surface $K_1$ is opposite to that of the image surface $K_2$ in FIG. 4 exemplified as the prior art. This fact is rather useful in simplifying the structure of the projection lens to be placed on the output side of the CRT or on the outside of the exit plane 5.

The reason why simplification is possible is based upon the so-called Petzval's theorem pertaining to the curvature of the image plane. In accordance with the Petzval's theorem, the following prerequisite must be satisfied for making a projected image over the entire field of the screen 3 by using the illustrated optical system illustrated in FIG. 1. That is to say, in case the CRT faceplate (fluorescent substance plane) 1 is flat, the lens must be composed of a combination of a convex lens (having a positive power) and a concave lens (having a negative power) in order to suppress the sum of algebraic powers. In order to minimize the power of the concave lens to be combined for simplifying the lens structure, the fluorescent substance plane should be of concave as is well known.

However, it is apparent that the present invention cannot be brought about only by the well known approach, i.e., the use of a concave fluorescent substance plane. As a requisite for constituting the present invention, the radius of curvature of the fluorescent substance plane must substantially satisfy the expression (6).

The basic embodiment of the present invention has heretofore been described. Practical embodiments of the present invention will now be described.

Figure 9:
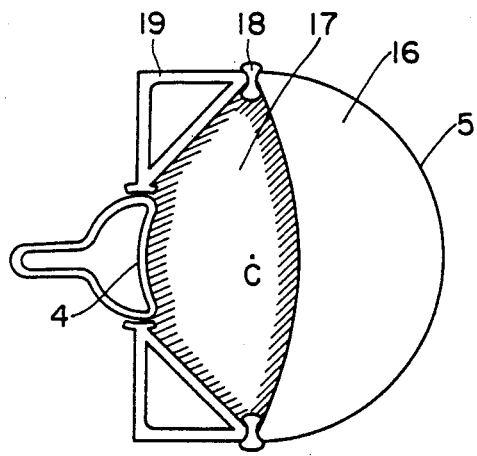

FIG. 9 shows one of practical embodiments of the present invention. In FIG. 9, numeral 4 denotes a fluorescent substance plane of the CRT and numeral 5 denotes an exit plane. Numeral 16 denotes glass or plastic material having a refractive index close to that of glass. Numeral 17 denotes a liquid having a refractive index close to that of glass such as ethylene glycol (ethanediol). Numeral 18 denotes a bonding member used for sealing. The bonding member 18 is made of silicon rubber, for example. Numeral 19 denotes a support fitting. The support fitting 19 serves as a supporter and a radiator.

Since the medium between the fluorescent substance plane 4 and the exit plane 5 is not entirely composed of glass, the weight is decreased and the temperature rise may also be restricted owing to the existence of the liquid 17. Various dimensional ratios remain unchanged from those in FIG. 7. This fact commonly applies to embodiments illustrated in FIGS. 10 to 14.

FIG. 10 shows another practical embodiment. The same components as those illustrated in FIG. 9 are attached with the same numerals. The glass or plastic material 16 is divided into two parts. Between those two parts, a liquid 17 is inserted. This structure facilitates fabrication.

FIG. 11 shows another practical embodiment of the present invention. In FIG. 11, numeral 4 denotes a fluorescent substance plane of a CRT, 5 an exit plane, 16 glass or plastic material, 19 a transparent bonding member or an adhesive member, and numeral 20 denotes a faceplate glass. In this embodiment, the maximum effective divergence angle $\theta$ is represented as $$\sin\theta \approx \frac{R_1}{R_1 + R_2} = \frac{1}{1 + n} \approx 0.4$$

Therefore, the light capture power is represented as $$\frac{\sin^2\theta}{\sin^2\theta_c} = \frac{\left(\frac{1}{1+n}\right)^2}{\frac{1}{n^2}} \approx 0.36$$

That is to say, approximately 36% of the light may be effectively used.

FIG. 12 further shows another practical embodiment of the present invention. In FIG. 12, numeral 4 denotes a CRT fluorescent substance plane, 5 an exit plane, and numeral 16 denotes glass or transparent plastic material. Numeral 17 denotes a transparent liquid, gel, or plastic material. Numerals 18 and 20 denote a sealing member and faceplate glass, respectively. The weight is advantageously reduced as compared with the case where the entire medium is made of glass.

FIG. 13 further shows another practical embodiment of the present invention. In FIG. 13, numeral 21 denotes a hole for collecting and seizing bubbles generated when the internal liquid 17 evaporates. Numeral 22 denotes plastics or rubber for absorbing the expansion and contraction caused by the temperature change of the internal liquid.

FIG. 14 further shows another practical embodiment of the present invention. In FIG. 14, numeral 22 denotes a cylindrical fitting. The sealing member is not illustrated for brevity. This embodiment facilitates manufacturing.

The embodiments of the present invention have heretofore been described as the extension of the CRT technology. However, it is apparent that the embodiments of the present invention may also be applied to a curved display unit which is obtained by using various display technology such as liquid crystal, plasma, light emitting diodes, and so on. Therefore, the scope of the present invention includes such an application.

As understood from the foregoing description, in accordance with the present invention, the divergence angle of the light emitted from CRT or the like may be limited to approximately 26°. Therefore, it becomes possible to attain the utilization effeciency of the luminous flux which is five times that of the prior art described referring to FIG. 1.

Further, as compared with the prior art which has been described by referring to FIG. 4, radical improvements may be introduced in the utilization efficiency of the luminous flux and the focusing characteristic.

Thus, the present invention may largely contribute to the industry.

I claim:

1. An image projection apparatus comprising:
   a concave radiant plane for forming an original image, the radius of curvature of said concave radiant plane being one unit of length;
   a transparent medium layer having a refractive index of n, where n>1;
   a convex light exit plane having a radius of curvature of approximately n units of length, said convex light exit plane being placed forwardly in the normal direction of said radiant plane at a distance of approximately (n+1) units of length therefrom;
   said transparent medium layer filling substantially the space between said concave radiant plane and said convex exit plane; and
   a vertex angle $\theta_3$ of the diverging light emitted from said light exit plane being $\theta_3 = \sin^{-1}(1/n^2)$.

2. An image projection apparatus according to claim 1, wherein the radius of curvature of said convex plane is 0.8 n to 1.2 n units of length, the spacing between said concave radiant plane and said convex plane is $(1+n) \times 0.8$ to $(1+n) \times 1.2$ units of length, where n is approximately 1.5, and said vertex angle $\theta_3$ is limited to within 30°.

* * * * *